No. 642,421. Patented Jan. 30, 1900.
G. H. BOYD.
INSECT TRAP.
(Application filed May 25, 1899.)
(No Model.)
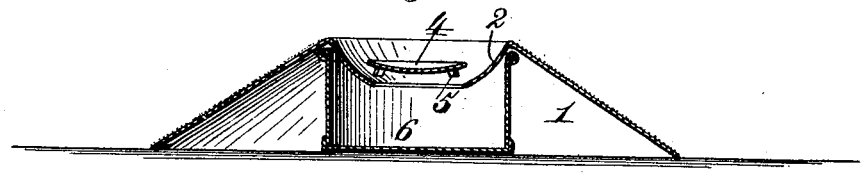
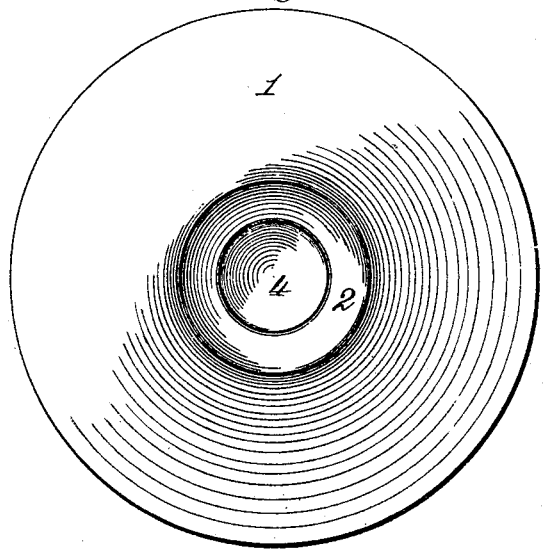
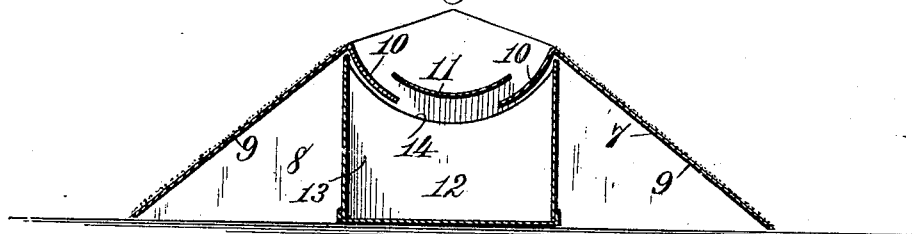
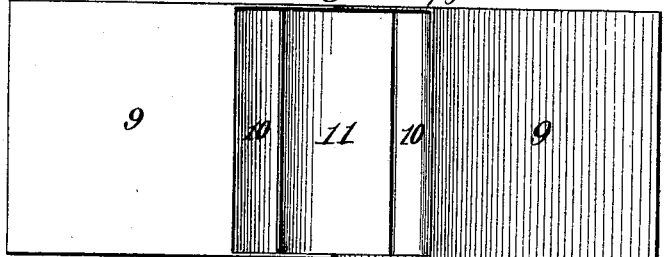
Witnesses,
Inventor:
George H. Boyd,
By James L. Norris,
Atty.

UNITED STATES PATENT OFFICE.

GEORGE H. BOYD, OF PARIS, TEXAS.

INSECT-TRAP.

SPECIFICATION forming part of Letters Patent No. 642,421, dated January 30, 1900.

Application filed May 25, 1899. Serial No. 718,178. (No model.)

*To all whom it may concern:*

Be it known that I, GEORGE H. BOYD, a citizen of the United States, residing at Paris, in the county of Lamar and State of Texas, have invented new and useful Improvements in Insect-Traps, of which the following is a specification.

This invention relates to insect-traps, and has for its object to provide a simple, inex10 pensive, and effective trap for catching insects, especially roaches, which will operate to cause the insects to drop into a vessel entirely separate from and unattached to the trap proper, whereby said vessel can be read15 ily and conveniently removed from the trap to any convenient point and the trapped insects destroyed.

To these ends my invention consists in the features and in the construction, combina20 tion, and arrangement of parts hereinafter described, and particularly pointed out in the claims following the description, reference being had to the accompanying drawings, forming a part of this specification, wherein—

Figure 1 is a vertical central sectional view of my improved trap. Fig. 2 is a plan view of the same. Fig. 3 is a vertical central sectional view of a modified form of trap, and Fig. 4 is a plan view of the same.

Referring to Figs. 1 and 2 of the drawings, the numeral 1 indicates a frusto-conical sheet-metal casing provided at its upper end with a downwardly and inwardly turned flange 2. The flange, as shown, is concave or cup-shaped and is formed integrally with the casing 1. Arranged centrally within the cup-shaped flange 2 is a saucer-shaped disk 4, constituting a bait-holder. As shown, the bait-holder is disposed above the lower end of the flange 2 and is held in position by arms 5, projecting from the edge of the disk 4 and attached at their ends to the flange 2, thus leaving an annular space between said flange and the periphery of the disk. Disposed centrally beneath the casing 1 is a cylindrical vessel or receptacle 6, preferably having vertical sides or walls, and in practice said vessel is made of such height that when placed beneath the casing or trap its upper edge will fit snugly between the angle formed by the upper end of the inclined sides of the casing and the flange 2, thereby preventing the escape of any of the trapped insects that might succeed in climbing the upright wall of the receptacle 6. Such arrangement also causes the casing to be accurately centered over the receptacle 6, thus rendering it unnecessary to exercise any care in setting the trap in position.

The outer surface of the trap or casing 1 is coated with an adhesive, over which is dusted or sprinkled sand to enable the insects to easily ascend the inclined sides of the trap.

The operation of my improved trap is as follows: The receptacle 6 is first placed on the floor or other desired spot, and the casing is then placed thereover, the upper edge of the receptacle guiding the casing accurately into position, so that it will rest centrally over the receptacle. A small quantity of any suitable bait is then placed in the bait-holder. The insects attracted by the bait will climb up the roughened inclined sides of the trap until they reach the top, but in attempting to descend the polished curved surface of the flange 2 will slip down thereover and under the bait-holder and be precipitated into the receptacle 6, from which they are unable to escape, as before described. To empty the receptacle, it is merely necessary to lift the trap from off the same, when the receptacle can be removed to any desired point and the insects emptied and destroyed and the receptacle cleaned. It will be seen that the receptacle is entirely separate and distinct from and unattached to the trap, permitting the ready and convenient removal of the receptacle for emptying and cleaning. This I have found to be a most convenient and advantageous arrangement and forms an important feature of my invention.

In Figs. 3 and 4 of the drawings I have shown a slightly-modified construction of the trap, but involving precisely the same features of invention. Referring to said figures, the numeral 7 indicates the trap or casing, comprising approximately triangular upright sides or walls 8 and inclined ends 9. The upper ends of the inclined walls 9 are bent downward and inward to form concave or curved flanges 10, that project toward the center of the trap, and disposed over the lower edges of said flanges is a dished bait-holder 11, preferably segment-shaped in cross-section, as shown. The bait-holder is so arranged that a space will intervene between its sides and the flanges 10, and it is supported in position by attaching its edges to the sides 8 of the trap. The inclined walls 9 of the trap are roughened in the manner before described. A receptacle 12 is placed beneath the trap and preferably consists of a rectangular vessel, the sides 13 of which are curved, as at 14, to permit them to conform to the shape of the flanges 10, whereby the upper edges of the end walls 15 are adapted to snugly fit into the angles between the upper ends of the walls 9 and flanges 10 for the purpose before explained. The operation of this modified form of trap is precisely the same as that before described. A suitable bait is placed in the bait-holder and the trap placed over the receptacle, the upper edges of the latter guiding the trap accurately into place over the receptacle. The insects climb up over the roughened inclined walls of the trap and in attempting to crawl down to the bait slip down the polished surfaces of the downwardly-curved flanges 10 and are precipitated into the receptacle beneath. The receptacle may be removed and cleaned by merely lifting off the trap in the manner before described. It will be manifest that one of the inclined walls 9 may be omitted, or rather made vertical, in the same manner as the sides 8.

My invention is especially designed for catching roaches; but it will be readily understood that it is equally well adapted for catching many different varieties of insects and animal life.

Having described my invention, what I claim is—

1. An insect-trap, comprising a bottomless casing having an inclined side provided at its upper end with an integral, downwardly and inwardly curved flange, and a fixed bait-holder supported above the lower edge of said flange, the outer edge of said bait-holder overlapping the lower edge of the flange, the parts being arranged to provide a space between the flange and bait-holder, substantially as described.

2. An insect-trap, comprising a bottomless casing having an inclined side provided at its upper end with a downwardly and inwardly curved flange, a bait-holder supported above the lower end of the flange, and an independent receptacle disposed beneath the casing and unattached thereto, substantially as described.

3. An insect-trap, comprising a frusto-conical sheet-metal casing provided at its upper end with an inwardly and downwardly curved flange, and a saucer-shaped bait-holder supported by said flange above the lower end thereof, and arranged to provide an annular space between the bait-holder and flange, substantially as described.

4. An insect-trap, comprising a frusto-conical sheet-metal casing provided at its upper end with an inwardly and downwardly curved flange, a saucer-shaped bait-holder supported above the lower end of said flange, and an independent receptacle disposed centrally beneath the casing and unattached thereto, substantially as described.

5. An insect-trap, comprising a frusto-conical sheet-metal casing provided at its upper end with an inwardly-turned and downwardly-curved annular flange, a bait-holder consisting of a disk disposed centrally within said annular flange intermediate the upper and lower ends of the latter and provided with radially-projecting arms attached at their outer ends to the said flange, and an independent receptacle movably disposed beneath the casing and fitting closely at its upper edge into the angle formed by the sides of the casing and annular flange, substantially as described.

6. An insect-trap, comprising a bottomless casing having inclined sides curved downwardly and inwardly at the upper end, a bait-holder arranged in the top of the casing, and an independent receptacle disposed beneath the casing and fitting closely at its upper edge, the angle formed by the inclined sides and the downwardly-turned upper ends thereof, substantially as described.

In testimony whereof I have hereunto set my hand in presence of two subscribing witnesses.

GEORGE H. BOYD.

Witnesses:
O. C. CONNOR,
JNO. T. DICKSON.